United States Patent
Lu et al.

(10) Patent No.: US 9,124,828 B1
(45) Date of Patent: Sep. 1, 2015

(54) APPARATUS AND METHODS USING A FLY'S EYE LENS SYSTEM FOR THE PRODUCTION OF HIGH DYNAMIC RANGE IMAGES

(71) Applicant: The United States of America as represented by the Secretary of the Navy, Washington, DC (US)

(72) Inventors: Ryan P. Lu, San Diego, CA (US); Bienvenido Melvin L. Pascoguin, La Mesa, CA (US); Ayax D. Ramirez, Chula Vista, CA (US); James Adleman, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 176 days.

(21) Appl. No.: 14/031,894

(22) Filed: Sep. 19, 2013

(51) Int. Cl.
  *H04N 5/335* (2011.01)
  *H04N 5/235* (2006.01)
  *G02B 3/00* (2006.01)
  *H04N 5/355* (2011.01)

(52) U.S. Cl.
  CPC .......... *H04N 5/35545* (2013.01); *G02B 3/0062* (2013.01); *H04N 5/2355* (2013.01)

(58) Field of Classification Search
  CPC ............ H04N 5/2355; H04N 5/35545; H04N 5/35554; H04N 5/35563; G06T 2207/20208; G02B 3/0062
  See application file for complete search history.

(56) References Cited

U.S. PATENT DOCUMENTS

| | | | |
|---|---|---|---|
| 7,419,267 B2 | 9/2008 | Whitehead et al. | |
| 7,663,705 B2 | 2/2010 | Asahi et al. | |
| 7,732,744 B2 * | 6/2010 | Utagawa | 250/208.1 |
| 8,320,047 B2 | 11/2012 | Tocci | |
| 2004/0008267 A1 * | 1/2004 | Chen et al. | 348/229.1 |
| 2007/0035653 A1 * | 2/2007 | Hong et al. | 348/340 |
| 2007/0177004 A1 * | 8/2007 | Kolehmainen et al. | 348/42 |
| 2007/0257184 A1 * | 11/2007 | Olsen et al. | 250/208.1 |
| 2009/0002639 A1 | 1/2009 | Corn et al. | |
| 2009/0195873 A1 | 8/2009 | Kubara | |
| 2011/0069189 A1 * | 3/2011 | Venkataraman et al. | 348/218.1 |
| 2012/0121248 A1 * | 5/2012 | Shirono | 396/544 |
| 2012/0188391 A1 | 7/2012 | Smith | |

FOREIGN PATENT DOCUMENTS

EP   1871091 A2 * 12/2007
JP   2002281361 A * 9/2002

OTHER PUBLICATIONS

Kuang et al., "Evaluating HDR Rendering Algorithms", ACM Trans. Appl. Percept., vol. 4, No. 2, 2007.

* cited by examiner

*Primary Examiner* — John Villecco
(74) *Attorney, Agent, or Firm* — SPAWAR Systems Center Pacific; Kyle Eppele; Ryan J. Friedl (57) ABSTRACT

Apparatus and methods for simultaneously producing multiple images of a subject are provided. The multiple images include images having different light intensity ranges that can be combined into a single image with a high dynamic range (HDR). The apparatus include a fly's eye lens system and at least one optical sensor.

12 Claims, 9 Drawing Sheets

APPARATUS AND METHODS USING A FLY'S EYE LENS SYSTEM FOR THE PRODUCTION OF HIGH DYNAMIC RANGE IMAGES

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 101608.

BACKGROUND

High dynamic range (HDR) imaging is a technique in which multiple images having differing light intensity (luminance) ranges are merged to produce an image having a high dynamic luminance range between the darkest and brightest areas of the image. The resulting HDR image more accurately represents the range of light intensity levels in the imaged subject than so the narrower dynamic range images from which it is produced. HDR images are commonly produced by merging images that are captured in succession. Unfortunately, the time delay between the successively captured images reduces the quality of the final HDR image.

SUMMARY

Apparatus and methods for simultaneously producing multiple images of a subject are provided.

One embodiment of an apparatus for producing images comprises: a fly's eye lens system comprising a plurality of lenses configured in a matrix; and an optical image sensor system comprising at least one optical sensor. The fly's eye lens system is configured to capture incident light from a subject to be imaged and to project an array of substantially spatially identical images of the subject onto the at least one optical sensor. In addition, one or both of the fly's eye lens system and the optical image sensor system are configured such that different images in the array of substantially spatially identical images captured by the optical image sensor have different light intensity ranges.

One embodiment of an apparatus for producing images comprises a fly's eye lens system comprising a plurality of lenses configured in a matrix, wherein at least one lens is configured to project a shadow image, at least one lens is coated with a first tinted coating and is configured to project a midtone image and at least one lens is coated with a second tinted coating and is configured to project a highlight image. The apparatus further comprises an optical image sensor system comprising a plurality of optical sensors arranged in a matrix, wherein each lens in the fly's eye lens system is configured to project a substantially spatially identical image onto one of the optical sensors of the optical sensor system. Within the matrix of optical sensors, at least one optical sensor has a first light intensity sensitivity, at least one optical sensor has a second light intensity sensitivity that is higher than the first light intensity sensitivity and at least one optical sensor has a third light intensity sensitivity that is higher than the second light intensity sensitivity.

One embodiment of a method for producing images comprises the steps of capturing incident light from a subject to be imaged with a fly's eye lens system comprising a plurality of lenses configured in a matrix, whereby an array of substantially spatially identical images of the subject is formed; and projecting the array of substantially spatially identical images onto an optical image sensor system comprising at least one optical sensor, wherein the substantially spatially identical images are captured simultaneously by the at least one optical sensor. At least one of the fly's eye lens system and the optical image sensor system is configured such that different images in the array of substantially spatially identical images captured by the at least one optical sensor have different light intensity ranges.

Other principal features and advantages of the invention will become apparent to those skilled in the art upon review of the following drawings, the detailed description, and the appended claims.

DETAILED DESCRIPTION

Apparatus and methods for simultaneously producing multiple images of a subject are provided. The multiple images include images having different light intensity ranges that can be combined into a single image with a high dynamic range (HDR). Because the apparatus and methods capture the images simultaneously they are well suited for producing images of both still and moving subjects.

An apparatus for simultaneously producing multiple images of a subject includes a fly's eye lens system comprising a plurality of lenses configured in a matrix and an optical image sensor system comprising at least one optical sensor. The fly's eye lens system is configured to capture incident light from a subject to be imaged and to project an array of substantially spatially identical images of that subject onto the at least one optical sensor of the optical image sensor system. Either the fly's eye lens system or the optical image sensor system—or both—are configured such that one or more images in the array of substantially spatially identical images have a light intensity range that differs from the light intensity range of one or more of the other images in the array.

As used herein, the phrase "spatially identical images" refers to images in which the subject matter composition (e.g., the spatial positioning and content of the subject matter) of the image is the same, although the light intensity range or color distribution can differ between the images. The phrase "substantially spatially identical images" refers to images in which differences in the subject matter composition are sufficiently small that they are not discernible by the average naked human eye and are suitable for use in generating high-resolution HDR images of the imaged subject matter. Spatially identical images are included within the definition of substantially spatially identical images. FIGS. 5A, 6A, 7A, 8A, 9A and 10A illustrate the concept of substantially spatially identical images. In these figures, each of the nine images has the same subject matter composition, although in FIGS. 5A, 8A, 9A and 10A the light intensity ranges for the images in each figure increase from the top row (darkest images) through the bottom row (brightest images).

Figure 1:
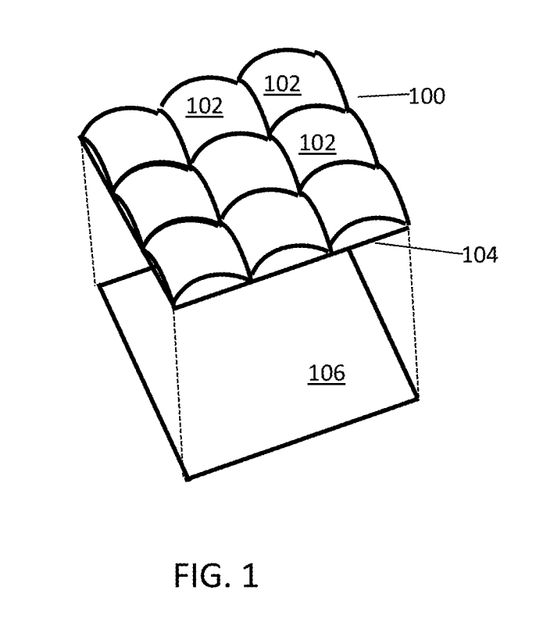
FIG. 1 is a schematic diagram of a fly's eye lens system configured to project multiple images of a subject onto a single optical sensor.
Figure 2:
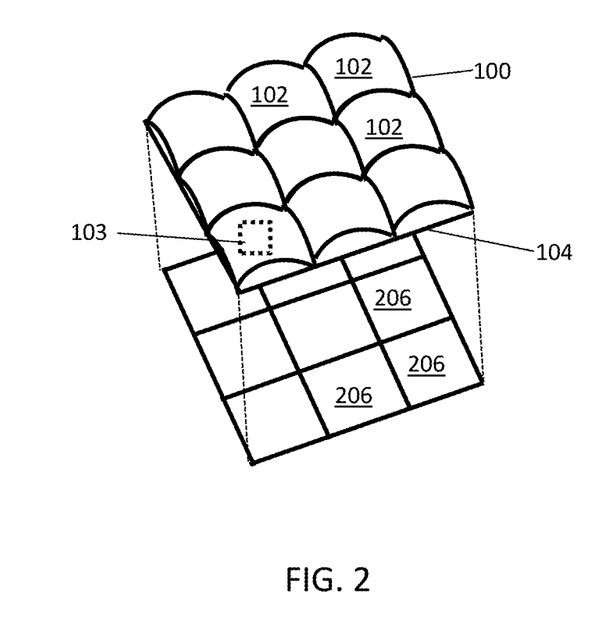
FIG. 2 is a schematic diagram of a fly's eye lens system configured to project multiple images of a subject onto an array of optical sensors.

Because an HDR image can be generated by merging as few as two lower dynamic range images, the fly's eye lens system can include as few as two lenses. However, embodiments comprising a greater number of lenses can be used to increase the dynamic range or color quality of the final HDR image, as discussed in greater detail below. For example, some embodiments of the apparatus include a fly's eye lens system comprising three or more lenses. This includes fly's eye lens systems comprising nine or more, ten or more, 20 or more, or even 100 or more lenses. An illustrative fly's eye lens system that can be used in the apparatus is shown in the schematic diagrams of FIGS. 1 and 2. The fly's eye lens system 100 includes a plurality of lenses 102 arranged in a matrix. As illustrated here, the matrix may comprise a planar two-dimensional array of convex lenses 102 arranged in an n×m (e.g., 3×3) grid, wherein the lens surfaces 104 disposed opposite the convex surfaces of the lenses are planar. Although the lenses in FIGS. 1 and 2 are square lenses arranged in a square array, other designs can be used. By way of illustration only, the lenses in the array can be square, rectangular or circular lenses, can be arranged in a square matrix or a hexagonal matrix and can have spherical or aspherical profiles. Examples of fly's eye lens arrays that can be used in the present apparatus and method include microlens arrays sold by Suss Microoptics, Edward Optics and Nikon Instruments.

In addition to the fly's eye lens system, the apparatus may include other lens systems (not shown), such as collimating lenses for collimating incident light onto the fly's eye lens system or for collimating the light projected by the fly's eye lenses onto an optical sensor. In addition, the apparatus may include corrective lens systems to correct artifacts and aberrations in the images.

Some embodiments of optical image sensor systems that can be used in the apparatus are illustrated in the schematic diagrams of FIGS. 1 and 2, which show an expanded perspective view of the fly's eye lens array 100 with an optical image sensor system that comprises a single optical sensor 106 (FIG. 1) and with an optical image sensor system that comprises a plurality of optical sensors 206 (FIG. 2) arranged in a matrix. In the embodiment of FIG. 1, optical sensor 106 is positioned relative to fly's eye lens system 100 such that each of the plurality of images projected by fly's eye lens system 100 is projected onto and captured by a different region of optical sensor 106. Similarly, in the embodiment of FIG. 2, optical sensors 206 are positioned such that each of the plurality of images projected by fly's eye lens system 100 is projected onto and captured by a different optical sensor 206. In the embodiment depicted in FIG. 2, there is a one-to-one correspondence between the lenses in fly's eye lens system 100 and optical sensors 206, whereby each lens has its own corresponding optical sensor, onto which it is configured to project an image. However, other correspondence ratios can be used. That is—within a fly's eye lens system 100, the lenses 102 may belong to different subsets, whereby each lens 102 in a given subset is configured to project an image onto the same optical sensor 106 or 206.

A variety of optical sensors 106 or 206 may be used in the apparatus, provided that they are able to capture the incident light projected thereon as an image. In some embodiments the optical sensors 106 or 206 do this via photoelectric conversion, whereby light is converted into electrons, which accumulate as a charge that can be subsequently converted into a digital value. This type of optical sensor includes CMOS sensors and CCD sensors. However, other optical sensors comprising other types of optically sensitive materials, including photographic film, can also be used.

In the apparatus, the fly's eye lens system 100, one or both of the optical image sensor system 106 or 206 are configured such that different images within an array of substantially spatially identical images are captured by sensors 106 or 206 with different light intensity ranges. While not necessary, it may be desirable to capture multiple images for each selected light intensity range so that the set of images for each range can be combined and averaged for noise reduction. The resulting noise-reduced image for a given light intensity range can then be used to form the final HDR image.

Figure 3:
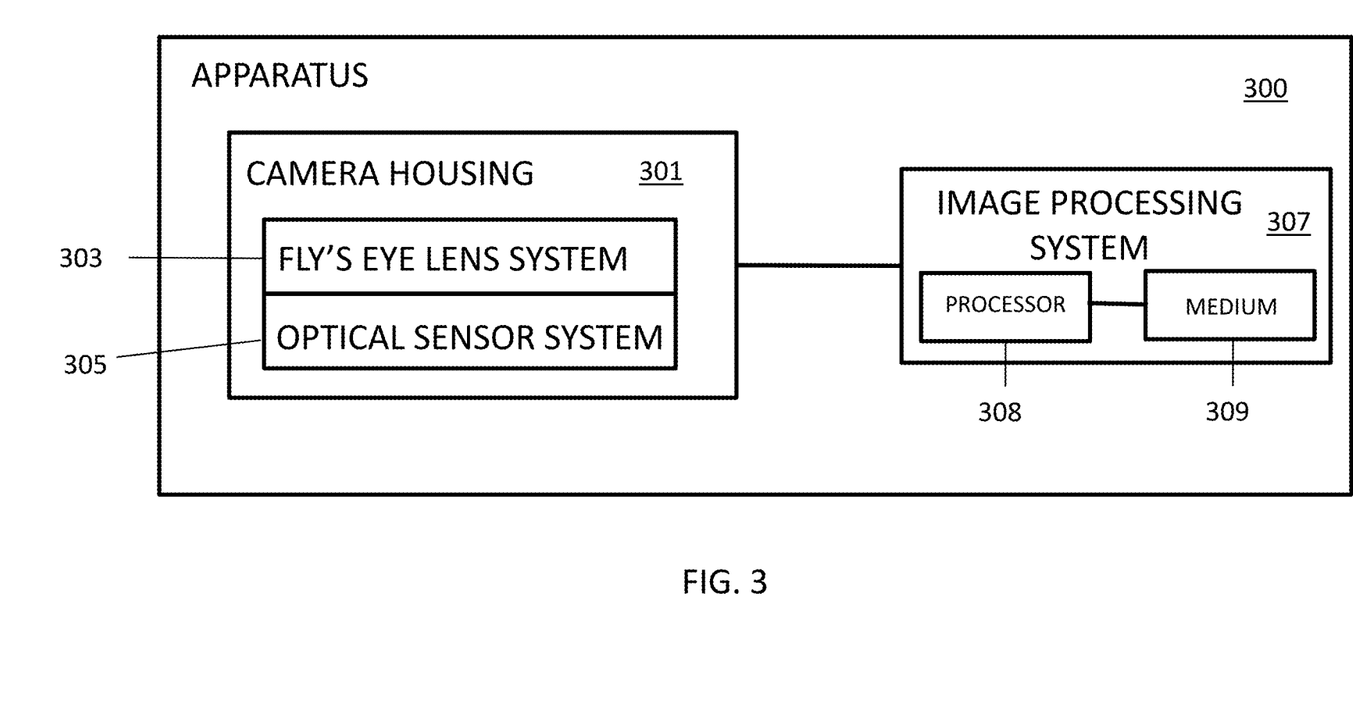
FIG. 3 is a box diagram of an apparatus for producing an HDR image from multiple simultaneously-captured images.

As shown in FIG. 3, the apparatus 300 may further include a protective housing, such as a camera housing 301, in which the fly's eye lens system 303 and the optical image sensor system 305 are contained. The apparatus may still further include an image processing system 307 in communication with optical image sensor system 305. Image processing system 307 comprises electrical circuitry and software for merging multiple images from the optical image sensor system into an HDR image. Although it is shown external to camera housing 301 in FIG. 3, image processing system 307 can also be an in-camera system. Suitable image processing systems are known and commercially available. Examples include HDR software packages available from Nikon® and Canon®, such as Canon's Digital Photo Professional software. Included within the suitable software packages are those that utilize a bilateral filter algorithm, as described in Kuang et al., "Evaluating HDR Rendering Algorithms", *ACM Transactions on Applied Perception*, Vol. 4, Issue 2, July 2007.

One embodiment of an image processing system 307 comprises a processor 308 and a non-transitory computer-readable medium 309 operably coupled to the processor 308. The non-transitory computer-readable medium 309 has computer-readable instructions stored thereon that, when executed by the processor 308, cause the apparatus to: receive image data for at least two substantially spatially identical images from the optical image sensor system 305; and merge the image data from the at least two substantially spatially identical images into a single image having an increased dynamic range relative to that of the lower dynamic range images from which it is produced. The image data may be transferred in various formats, including raw and Joint Photographic Experts Group (JPEG) formats.

Figure 4:
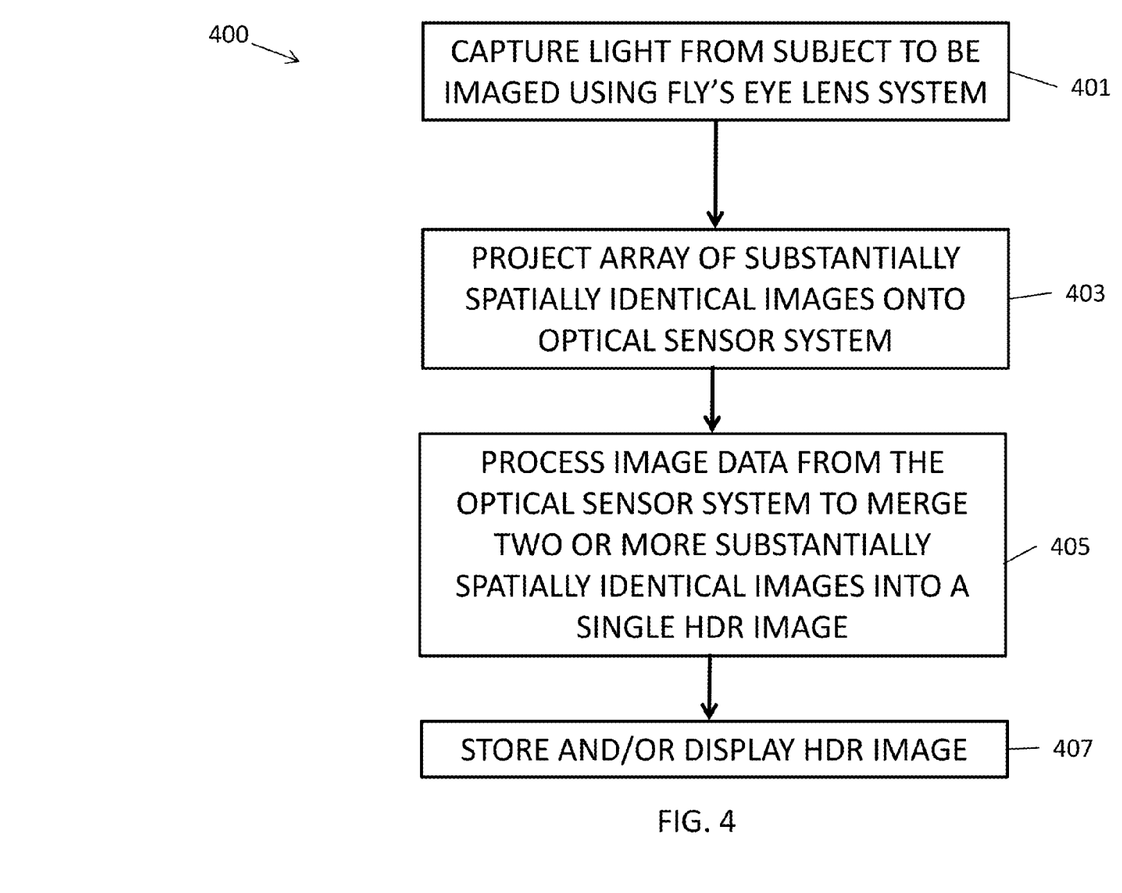
FIG. 4 is a flowchart illustrating a method for producing an HDR image using the apparatus of FIG. 3.

The basic steps in a method 400 for producing an HDR image using the apparatus of FIG. 3 is shown in the flowchart of FIG. 4. In a first step 401, light is captured from a subject to be imaged using the fly's eye lens system. The fly's eye lens system projects an array of substantially spatially identical images onto the optical image sensor system 403. In a following step 405, image data from the optical image sensor system is processed to merge two or more substantially spatially identical images into a single HDR image. Finally, as shown in step 407, the resulting HDR image is stored or displayed. The method may further comprise the step of assembling a plurality of the HDR images in a sequence to create an HDR video.

The captured images will include at least two images having different light intensity ranges, such that one of the captured images is brighter than the other. In some embodiments, the apparatus is configured such that the optical image sensor system captures images with at least three different light intensity ranges. For example, the optical image sensor system 305 may capture three images (or three sets of images) in which a first image (or a first set of images) preferentially preserves low light intensity regions of the image, a second image (or a second set of images) preferentially preserves high-light intensity regions of the image, and a third image (or a third set of images) preferentially preserves the regions of the image having a light intensity intermediate between the low- and high-light intensity regions.

By way of illustration, an image that preferentially preserves the low light intensity regions of an image shifts the intensity distribution toward higher intensities, thus providing a brighter image that allows details to be resolved in the low-light or 'shadow' areas. Such images are referred to herein as shadow images. An image that preferentially preserves the high-light intensity regions of an image shifts the intensity distribution toward lower intensities, thus providing a darker image that allows details to be resolved in the high-light areas. Such images are referred to herein as highlight images. Finally, images that preferentially preserve the intermediate light intensity regions at the expense of the low- and high-light intensity regions are referred to herein as midtone images.

Two approaches can be adopted to provide captured images having different light intensity ranges. In the first approach, the lenses in the fly's eye lens systems, such as system 100, are configured to project images having different light intensity ranges onto one or more optical sensors 106 or 206. In the second approach, the optical sensors 106 or 206 have different light intensity responses, such that images arriving at the optical sensors 106 or 206 will be registered with different light intensity ranges, even if those images arrive at the sensors having the same light intensity range. In some embodiments of the apparatus, the approaches are combined, such that images having different light intensity ranges are projected onto optical sensors 106 or 206 having different light intensity responses.

The light intensity ranges of the images projected by the lenses, such as lenses 102 of the fly's eye lens system 100 can be controlled by selectively coating one or more of the lenses 102 (or one or more sets of lenses) with coatings that preferentially transmit a desired light intensity range relative to other light intensity ranges. For example, one or more coatings that selectively filter out high intensity light can be used. As a result, lenses 102 that include the coatings will project darker images onto the optical sensors 106 or 206. Different coatings that filter light to different degrees can be applied to different lenses 102 to provide a fly's eye lens system 100 that projects images having different light intensity ranges onto the optical sensors 106 or 206. The coatings may be applied to one or more surfaces of the lenses 102 through with light from a subject to be images passes.

Alternatively, the light intensity ranges projected by the lenses of the fly's eye lens system 100 can be controlled by optical intensity modulators 103 (see FIG. 2) associated with, either via connection, coupling, contact, or other means, one or more of the lenses 102 (or one or more sets of lenses) that preferentially transmit a desired light intensity range relative to other light intensity ranges. For example, one or more optical intensity modulators 103 that selectively remove or reduce high intensity light can be used. As a result, lenses 102 having an associated optical intensity modulator 103 will project darker images onto the optical sensors 206. Different optical intensity modulators that remove or reduce high intensity light to different degrees can be associated with different lenses to provide a fly's eye lens system that projects images having different light intensity ranges onto the optical sensors. Examples of optical intensity modulators include liquid crystals, mechanical shutters, light filters and MEMS mirrors.

In one embodiment of a fly's eye lens system, such as system 100, the lenses 102 are configured such that the projected images will include at least two images having different light intensity ranges, whereby one of the at least two projected image is brighter than the other. In some embodiments, the fly's eye lens system is configured such that the projected images will include images having at least three different light intensity ranges. For example, the fly's eye lens system 100 may project three images (or three sets of images) in which a first image (or a first set of images) preferentially preserves low light intensity regions of the image, a second image (or a second set of images) preferentially preserves high-light intensity regions of the image, and a third image (or a third set of images) preferentially preserves the regions of the image having a light intensity intermediate between the low and high-light intensity regions. For example, the first image projected from the fly's eye lens system 100 can be a shadow image, the second image can be a midtone image and the third image can be a highlight image. Because maximum light transmission is desirable for shadow images, lenses 102 configured to project a shadow image may be free of the coatings and/or optical intensity modulators.

The light intensity responses of the optical sensors 106 or 206 in the optical image sensor system can be controlled, for example, by selectively tuning their voltage thresholds. Thus, different optical sensors 106 or 206 (or sets of optical sensors) in the optical image sensor systems, such as system 305, can have different light intensity sensitivity settings to allow for the capture of images having different light intensity ranges—even if those images arrive at the optical sensors 106 or 206 having the same light intensity range.

In one embodiment of an optical image sensor system, such as system 305, the optical sensors 106 or 206 are configured such that the captured images will include at least two images that are registered with different light intensity ranges, wherein one captured image is brighter than the other. In some embodiments, the optical image sensor system is configured such that the captured images will include images that are registered with least three different light intensity ranges. For example, the optical image sensor system may capture three images (or three sets of images) in which a first image (or a first set of images) is captured by one or more optical sensors having a high light sensitivity setting, a second image (or a second set of images) is captured by one or more optical sensors having a low light sensitivity setting, and a third image (or a third set of images) is captured by one or more optical sensors having a light sensitivity setting intermediate between the low and high light sensitivity settings. This optical sensor configuration can be used to capture a shadow image, a midtone image and a highlight image.

In addition to (or as an alternative to) having different light intensity sensitivities, individual optical sensors, such as sensors 106 or 206, within the optical image sensor system, such as system 305, can be configured to preferentially capture light over different wavelength ranges. For example, different optical sensors 106 or 206 can be configured to preferentially capture different ranges of color in the visible region of the electromagnetic spectrum. Examples of color ranges that are useful in image processing applications using two common color registration schemes are RGB (Red, Green, and Blue) and CMYG (Cyan, Magenta, Yellow, and Green).

FIGS. 5-10 illustrate various fly's eye lens system and optical image sensor system configurations 500-1000 for producing substantially spatially identical images having different light intensity ranges using the two approaches discussed above. In each figure, the left panel (panel (A)) shows a 3×3 array of substantially spatially identical images projected from a 3×3 lens matrix of a fly's eye lens system. The right panel (panel (B)) in each figure is a schematic representation of the optical sensor or optical sensors in an optical image sensor system onto which the lenses project the substantially spatially identical images.

Figure 5A:
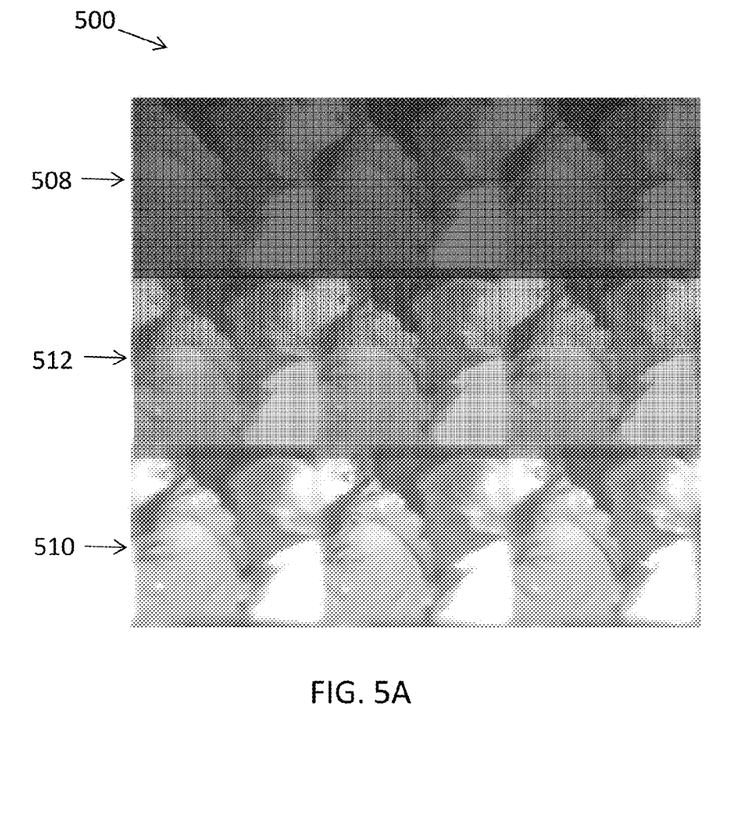
FIG. 5A illustrates a representation of a 3×3 array of substantially spatially identical images having different light intensity ranges.
Figure 5B:
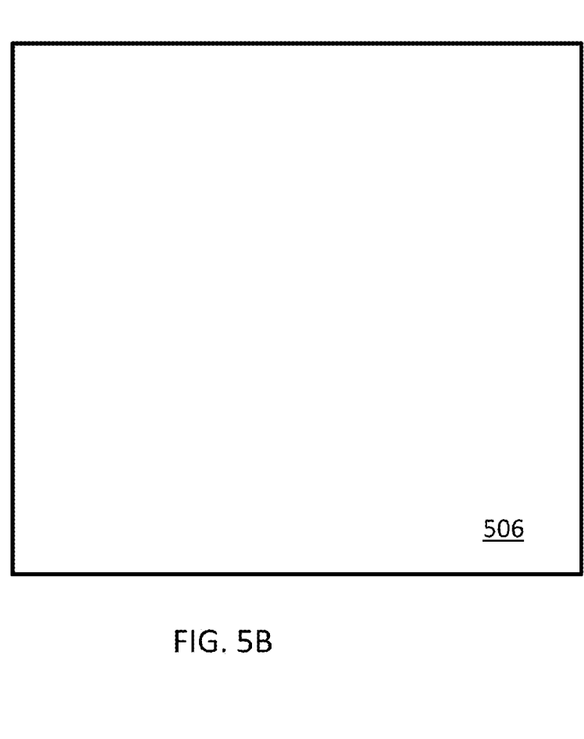
FIG. 5B illustrates a schematic diagram of an embodiment of an optical sensor of the optical image sensor system.

FIG. 5 illustrates a configuration 500 for producing an array of substantially spatially identical images in which the fly's eye lens system is configured to project images with different light intensity ranges onto different regions of a single optical sensor 506. In FIG. 5(A), the three lenses in the top row are configured to project images that appear darker than those in the middle or bottom row. These figures are highlight images 508 because they allow details in the highlight areas to be resolved at the expense of the low-light areas. The three lenses in the bottom row are configured to project images that appear brighter than those in the middle or top row. These figures are shadow images 510 because they allow details in the low-light areas to be resolved at the expense of the high-light areas, which are washed out. The lenses in the middle row of lenses are configured to project midtone images 512.

Figure 6A:
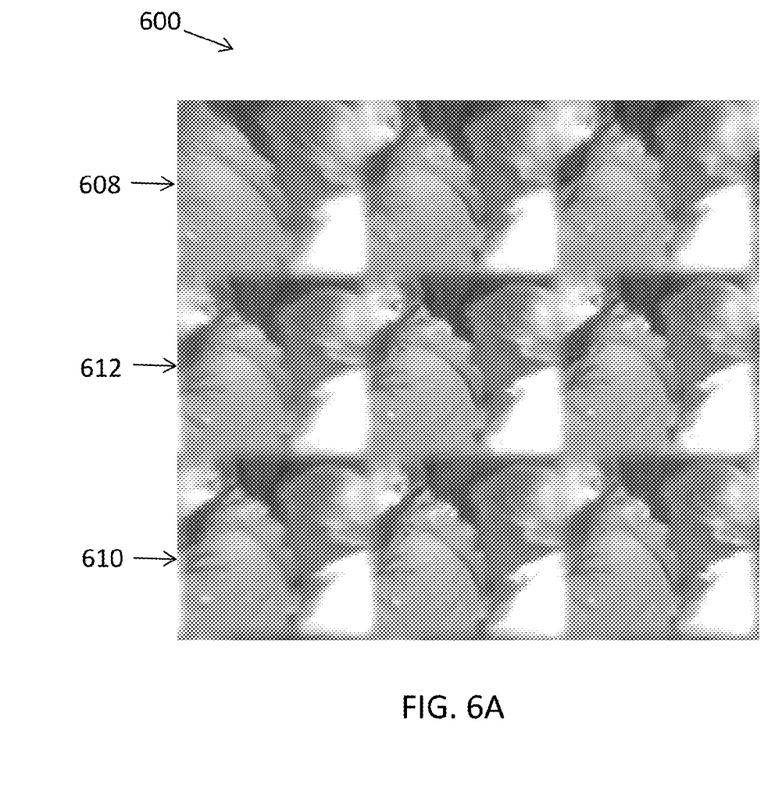
FIG. 6A illustrates a representation of a 3×3 array of substantially spatially identical images having the same light intensity range.
Figure 6B:
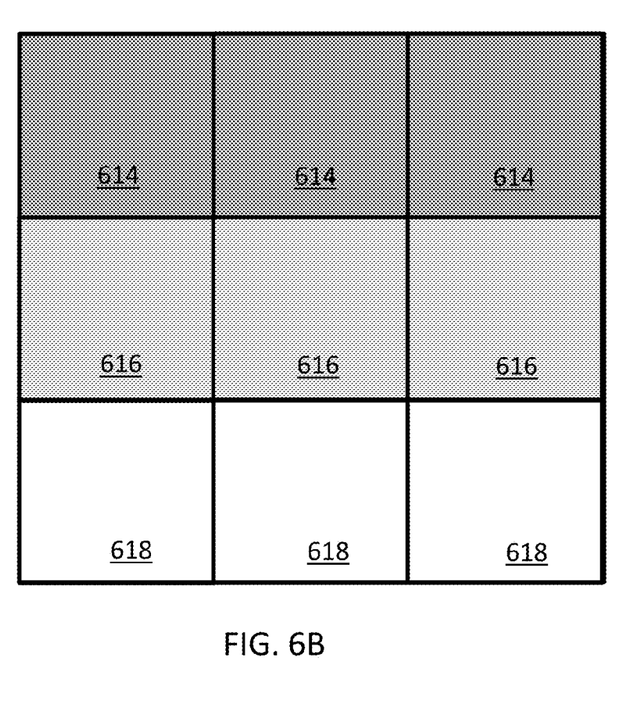
FIG. 6B illustrates a schematic diagram of an embodiment of optical sensors of the optical image sensor system having different light intensity sensitivities.

FIG. 6 illustrates a configuration 600 for producing an array of substantially spatially identical images in which the fly's eye lens system is configured to project images having the same light intensity ranges (FIG. 6(A)) onto a plurality of optical sensors having different light intensity sensitivities, such that different optical sensors register the images with different light intensity ranges. Specifically, the optical sensors in the top row 614 are configured to capture highlight images, the optical sensors in the middle row 616 are configured to capture midtone images and the optical sensors in the bottom row 618 are configured to capture shadow images.

Figure 7A:
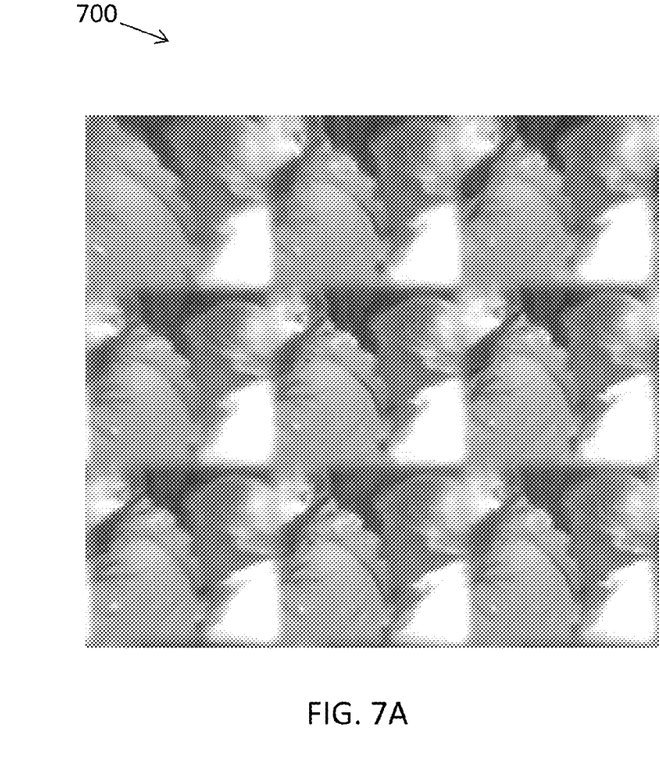
FIG. 7A illustrates a representation of a 3×3 array of substantially spatially identical images having the same light intensity range.
Figure 7B:
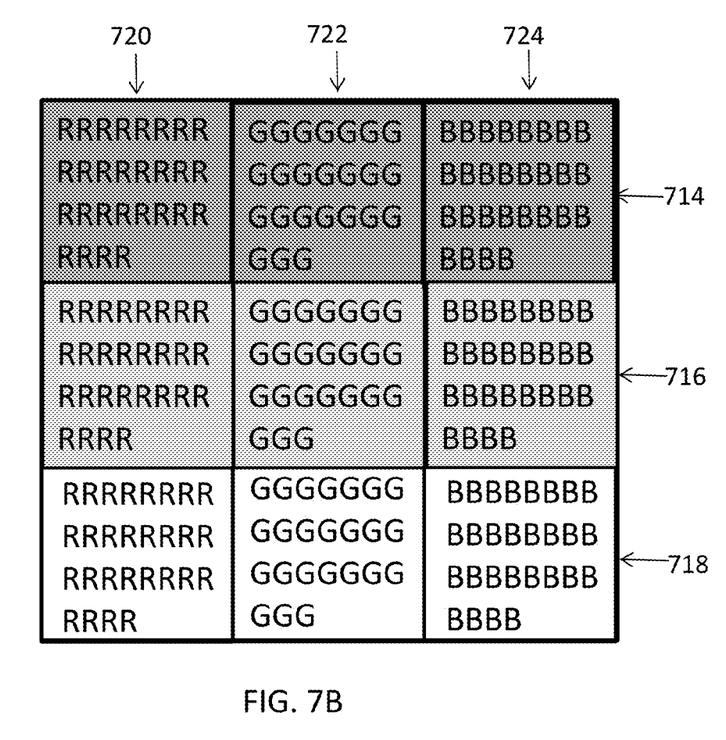
FIG. 7B illustrates a schematic diagram of an embodiment of optical sensors of the optical image sensor system having different light intensity sensitivities and different color selectivities.

Like FIG. 6, FIG. 7 illustrates a configuration 700 for producing an array of substantially spatially identical images in which the fly's eye lens system, such as system 100, is configured to project images having the same light intensity range (FIG. 7(A)) onto optical sensors, such as sensors 106 or 206, configured to capture highlight images 714, midtone images 716 and shadow images 718. However, in this embodiment, the optical sensors are further organized such that different sets of sensors within the plurality of optical sensors are configured to preferentially capture light over different wavelength ranges (e.g., light of different colors) relative to other wavelength ranges. Specifically, the optical sensors in the first column 720 are configured to preferentially capture red light, the optical sensors in the middle column 722 are configured to preferentially capture green light and the optical sensors in the last column 724 are configured to preferentially capture blue light.

Figure 8A:
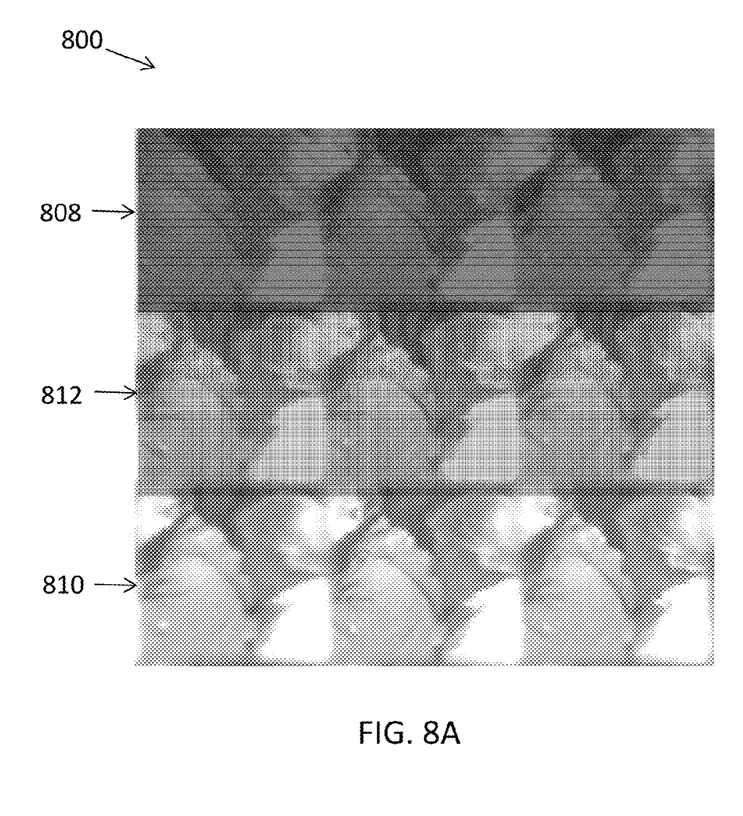
FIG. 8A illustrates a representation of a 3×3 array of substantially spatially identical images having different light intensity ranges.
Figure 8B:
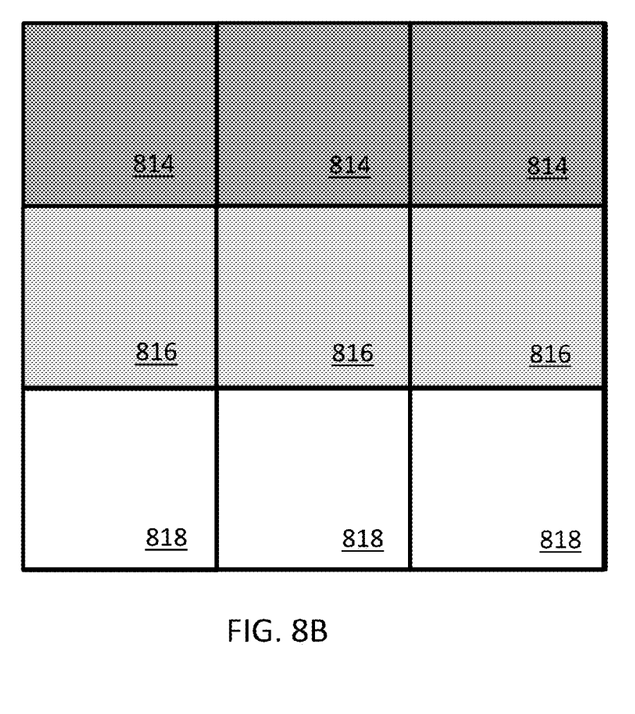
FIG. 8B illustrates a schematic diagram of an embodiment of optical sensors of the optical image sensor system having different light intensity sensitivities.
Figure 9A:
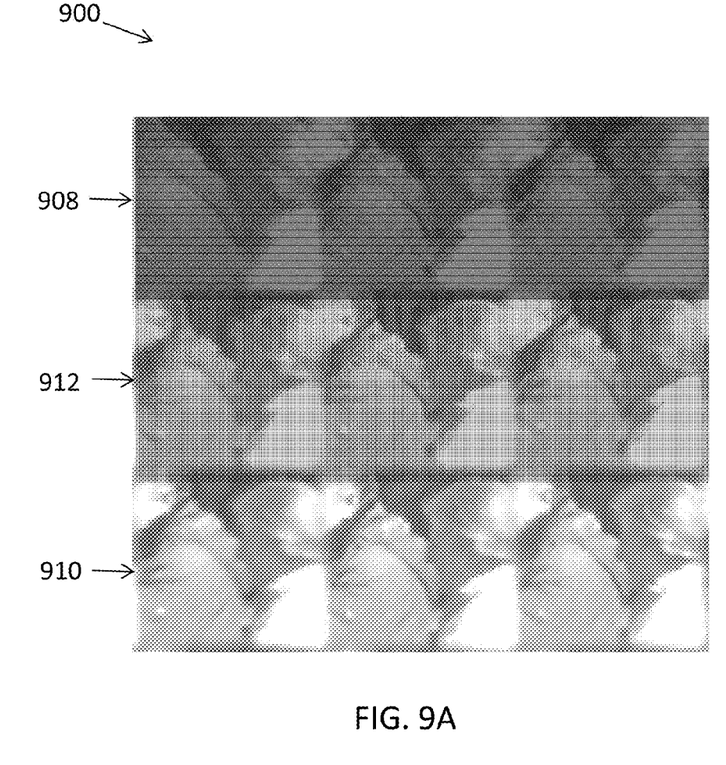
FIG. 9A illustrates a representation of a 3×3 array of substantially spatially identical images having different light intensity ranges.
Figure 9B:
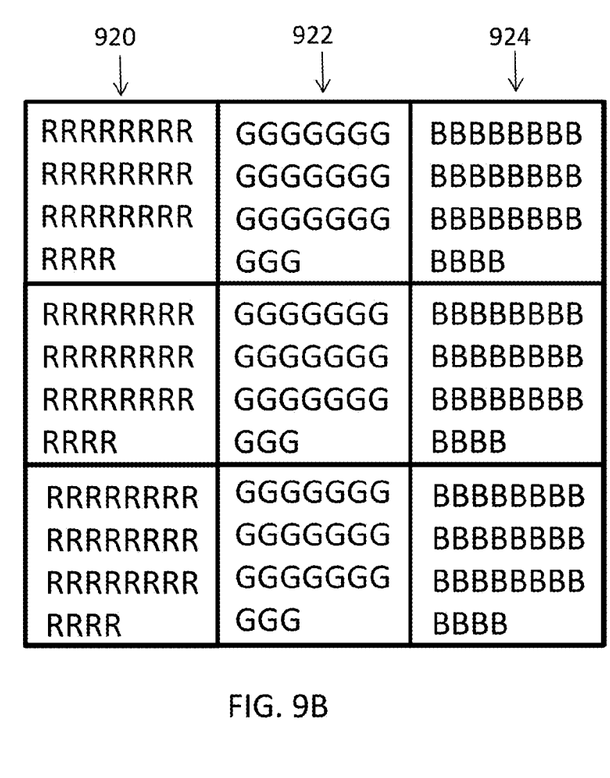
FIG. 9B illustrates a schematic diagram of an embodiment of optical sensors of the optical image sensor system having different color selectivities.
Figure 10A:
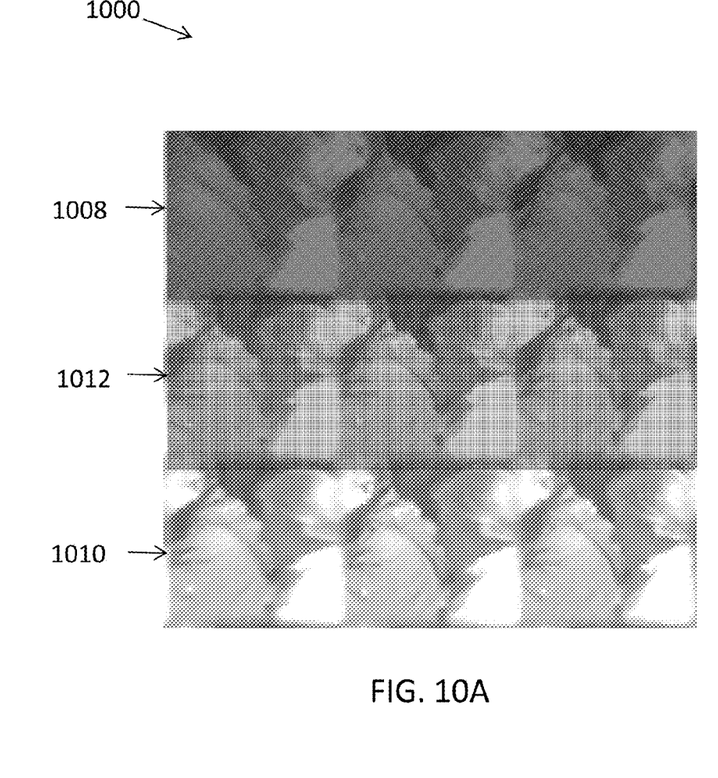
FIG. 10A illustrates a representation of a 3×3 array of substantially spatially identical images having different light intensity ranges.
Figure 10B:
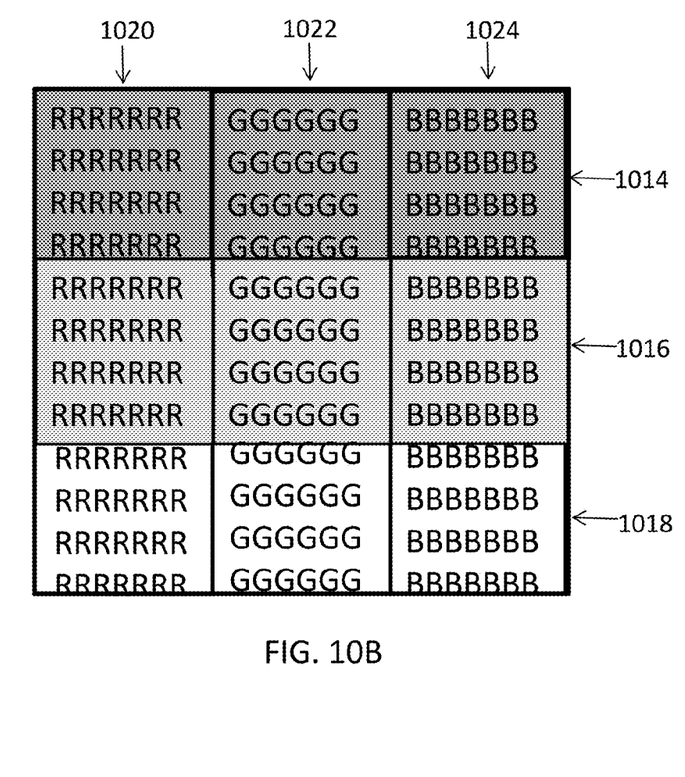
FIG. 10B illustrates a schematic diagram of an embodiment of optical sensors of the optical image sensor system having different light intensity sensitivities and different color selectivities.

FIGS. 8-10 illustrate a variety of configurations 800, 900, and 1000, for producing an array of substantially spatially identical images in which the fly's eye lens system, such as system 100, is configured to project images with different light intensity ranges and the optical image sensor system is configured to register images at different light intensity ranges. The fly's eye lens system depicted in FIG. 8(A) comprises a top row of lenses configured to transmit highlight images 808, a middle row of lenses configured to transmit midtone images 812 and a bottom row of lenses configured to transmit shadow images 810. In order to further enhance the quality of each image, in this embodiment, the optical sensors in the top row 814 are configured to capture highlight images, the optical sensors in the middle row 816 are configured to capture midtone images and the optical sensors in the bottom row 818 are configured to capture shadow images.

FIG. 9 illustrates a configuration 900, wherein the lens system, such as system 100, comprises a top row of lenses configured to transmit highlight images 908, a middle row of lenses configured to transmit midtone images 912 and a bottom row of lenses configured to transmit shadow images 910 (FIG. 9(A)). In this embodiment, each of sensors, such as sensors 106 or 206, in the plurality of optical sensors has the same light intensity sensitivity, but different sets of sensors within the plurality of optical sensors are configured to preferentially capture light over different wavelength ranges (e.g., light of different colors) FIG. 9(B)). Specifically, the optical sensors in the first column 920 are configured to preferentially capture red light, the optical sensors in the middle column 922 are configured to preferentially capture green light and the optical sensors in the last column 924 are configured to preferentially capture blue light.

FIG. 10 illustrates a configuration 1000, wherein the lens system, such as system 100, comprises a top row of lenses configured to transmit highlight images 1008, a middle row of lenses configured to transmit midtone images 1012 and a bottom row of lenses configured to transmit shadow images 1010 (FIG. 10(A)). In this embodiment, the optical sensors, such as sensors 106 or 206, in the top row 1014 are configured to capture highlight images, the optical sensors in the middle row 1016 are configured to capture midtone images and the optical sensors in the bottom row 1018 are configured to capture shadow images (FIG. 10(B)). In addition, the optical sensors in the first column 1020 are configured to preferentially capture red light, the optical sensors in the middle column 1022 are configured to preferentially capture green light and the optical sensors in the last column 1024 are configured to preferentially capture blue light.

Some or all of the steps of method 400 may be computer-implemented using a programmable device, such as a computer-based system. Method 400 may comprise instructions that, when loaded into a computer-based system, cause the system to execute the steps of method 400. Method 400 may be implemented using various programming languages, such as "Java", "C", or "C++".

Various storage media, such as magnetic computer disks, optical disks, and electronic memories, as well as non-transitory computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, such as processor 308, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The dimensions provided herein are illustrative as one skilled in the art could deviate from these dimensions and obtain similar results. The word "illustrative" is used herein to mean serving as an illustrative, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

It is understood that many additional changes in the details, materials, steps and arrangement of parts, which have been herein described and illustrated to explain the nature of the invention, may be made by those skilled in the art within the principle and scope of the invention as expressed in the appended claims. The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

The invention claimed is:

1. An apparatus comprising:
    a fly's eye lens system comprising a plurality of lenses configured in a matrix; and
    an optical image sensor system comprising a plurality of optical sensors such that each of the lenses has a corresponding optical sensor onto which it is configured to project an image,
    wherein the fly's eye lens system is configured to capture incident light from a subject to be imaged and to project an array of substantially spatially identical images of the subject onto the optical sensors, wherein different lenses in the fly's eye lens system are coated with different coatings such that images projected onto the optical sensors by the different lenses have different light intensity ranges and wherein different optical sensors have different light intensity sensitivities such that images captured by the different optical sensors have different light intensity ranges.

2. The apparatus of claim 1, wherein at least one lens in the fly's eye lens system is configured to project a shadow image, at least one lens in the fly's eye lens system is configured to project a midtone image, and at least one lens in the fly's eye lens system is configured to project a highlight image.

3. The apparatus of claim 1, wherein different optical sensors within the plurality of optical sensors are configured to capture light over different wavelength ranges.

4. The apparatus of claim 3, wherein at least one optical sensor is configured to capture a shadow image, at least one optical sensor is configured to capture a midtone image, and at least one optical sensor is configured to capture a highlight image.

5. The apparatus of claim 1, wherein at least one optical sensor is configured to capture a shadow image, at least one optical sensor is configured to capture a midtone image, and at least one optical sensor is configured to capture a highlight image.

6. The apparatus of claim 1, wherein at least one optical sensor is configured to capture a shadow image and further configured to capture red light, at least one optical sensor is configured to capture a midtone image and further configured to capture red light, and at least one optical sensor is configured to capture a highlight image and further configured to capture red light; at least one optical sensor is configured to capture a shadow image and further configured to capture green light, at least one optical sensor is configured to capture a midtone image and further configured to capture green light and at least one optical sensor is configured to capture a highlight image and further configured to capture green light; and at least one optical sensor is configured to capture a shadow image and further configured to capture blue light, at least one optical sensor is configured to capture a midtone image and further configured to capture blue light and at least one optical sensor is configured to capture a highlight image and further configured to capture blue light.

7. The apparatus of claim 1, wherein the fly's eye lens system further comprises one or more optical intensity modulators associated with one or more corresponding lenses, wherein different optical intensity modulators are configured to modulate optical intensity to different degrees, such that images projected onto the at least one optical sensor via different optical intensity modulators will have different light intensity ranges.

8. The apparatus of claim 1, further comprising:
    a processor; and
    a non-transitory computer-readable medium operably coupled to the processor, the non-transitory computer-readable medium having computer-readable instructions stored thereon that, when executed by the processor, cause the apparatus to receive image data for at least two of the substantially spatially identical images from the at least one optical sensor and merge the image data from the at least two substantially spatially identical images into a single image having a higher dynamic range than any of the at least two substantially spatially identical images.

9. An apparatus comprising:

a fly's eye lens system comprising a plurality of lenses configured in a matrix, wherein at least one lens is configured to project a shadow image, at least one lens is coated with a first tinted coating and is configured to project a midtone image, and at least one lens is coated with a second tinted coating and is configured to project a highlight image; and an optical image sensor system comprising a plurality of optical sensors arranged in a matrix, wherein each lens in the fly's eye lens system is configured to project a substantially spatially identical image onto one of the optical sensors of the optical sensor system, and further wherein at least one optical sensor has a first light intensity sensitivity, at least one optical sensor has a second light intensity sensitivity that is higher than the first light intensity sensitivity, and at least one optical sensor has a third light intensity sensitivity that is higher than the second light intensity sensitivity.

10. A method comprising the steps of:

capturing incident light from a subject to be imaged with a fly's eye lens system comprising a plurality of lenses configured in a matrix, whereby an array of substantially spatially identical images of the subject is formed; and projecting the array of substantially spatially identical images onto an optical image sensor system comprising a plurality of optical sensors such that each of the lenses has a corresponding optical sensor onto which it is configured to project an image, wherein the substantially spatially identical images are captured simultaneously by the optical sensors, wherein different lenses in the fly's eye lens system are coated with different coatings such that images projected onto the optical sensors by the different lenses have different light intensity ranges and wherein different optical sensors have different light intensity sensitivities such that images captured by the different optical sensors have different light intensity ranges.

11. The method of claim 10, further comprising the step of merging the substantially spatially identical images captured by the at least one optical sensor into a single image, wherein the single image has a higher dynamic range than any of the individual substantially spatially identical images.

12. The method of claim 10, wherein different optical sensors within the plurality of optical sensors are configured to capture light over different wavelength ranges.

* * * * *